Figure 1:
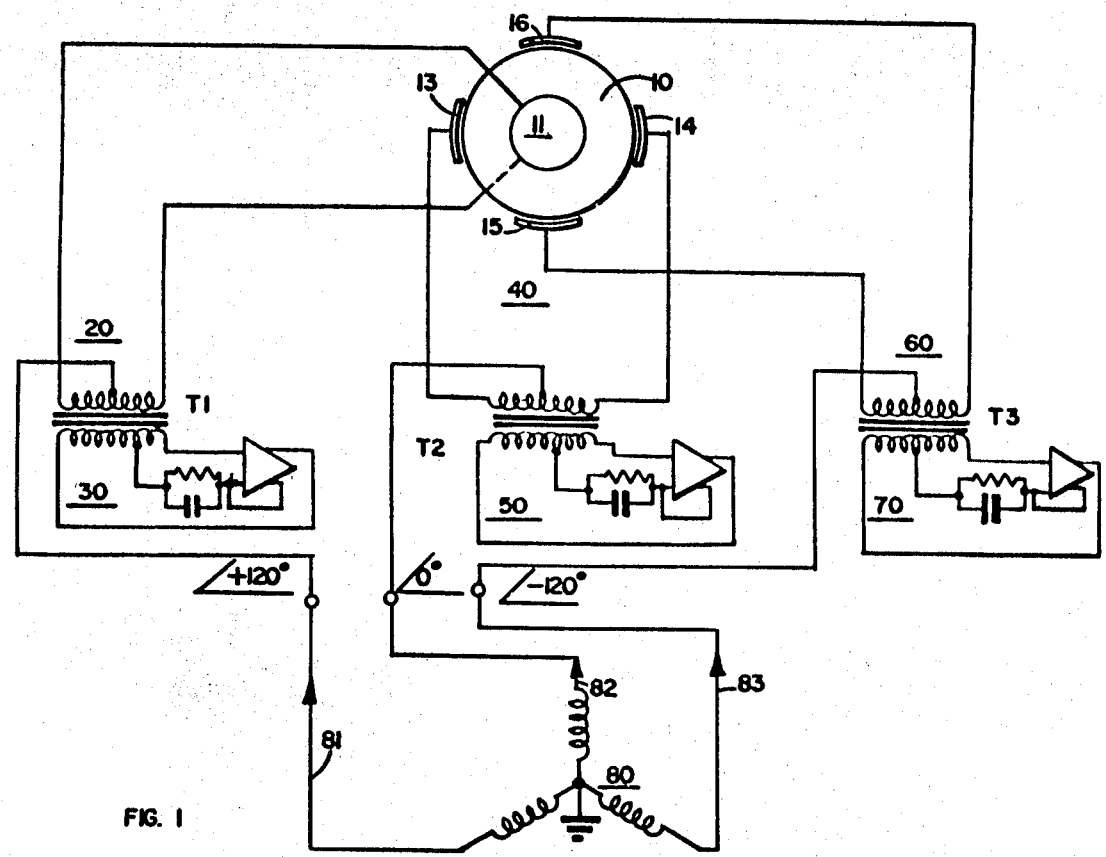

United States Patent

[11] 3,619,014

| | | |
|---|---|---|
| [72] | Inventor | William H. Quick<br>La Mirada, Calif. |
| [21] | Appl. No. | 31,808 |
| [22] | Filed | Apr. 2, 1970 |
| [45] | Patented | Nov. 9, 1971 |
| [73] | Assignee | North American Rockwell Corporation<br>Continuation of application Ser. No.<br>442,135, Mar. 23, 1965. |

[54] GYROSCOPE
12 Claims, 2 Drawing Figs.

[52] U.S. Cl. .................................................. 308/10,
74/5
[51] Int. Cl. ..................................................... F16c 39/06
[50] Field of Search ........................................... 308/10;
74/5; 73/382, 517

[56] References Cited
UNITED STATES PATENTS

| 3,090,239 | 5/1963 | Dacus ........................ | 308/10 |
| 3,334,949 | 8/1967 | Atkinson ..................... | 308/10 |
| 3,411,838 | 11/1968 | Atkinson ..................... | 308/10 |

Primary Examiner—D. F. Duggan
Assistant Examiner—R. Skudy
Attorney—L. Lee Humphries

ABSTRACT: A gyroscope including a rotor positioned between a plurality of electrodes. An electrostatic support arrangement establishes an AC potential between the rotor and the electrodes. A differential sensing arrangement for providing a position signal is secured to the electrodes. A servo arrangement, including an amplifier, is connected between the sensing arrangement and a power supply circuit for maintaining the rotor centered between the electrodes.

PATENTED NOV 9 1971 3,619,014

INVENTOR.
WILLIAM H. QUICK

BY *Vincent H. Cleary*

ATTORNEY

GYROSCOPE

This is a continuation of application Ser. No. 442,135, filed on Mar. 23, 1965.

This invention relates to an electrostatic type bearing and more specifically to an improvement in a gyro employing an electrostatically supported free rotor.

When an electrostatically supported gyro is supported by alternating current, the position of the rotor with respect to the electrostatic electrodes can be measured or determined by the difference in supporting current passing through coaxial electrodes. However, when the rotor is off center, if the supporting current is used to sense position of the rotor, the restoring voltage is fed back into the servoamplifier so as to prevent proper restoring force on the rotor. This can be overcome by utilizing a signal other than the supporting signal and at different frequency as part of the sensing current. This, however, requires a separated generator and loop for sensing and centering the rotor.

Accordingly, an object of the invention is to provide a new and improved support circuit for an electrostatic rotor.

Another object of the invention is the provision of a support circuit for the rotor of an electrostatic gyro which utilizes the minimum of stages yet efficiently centers the rotor. A still further object of the invention is to provide a control circuit for electrostatically supporting the rotor of a free rotor gyroscope which is stable and does not require additional oscillators for sensing the position of the rotor while being electrostatically supported.

A feature of the present invention is a control circuit for an electrostatically supported rotor which circuit senses displacement of the rotor between two electrodes by utilizing the control current between the electrodes and the rotor. This resultant sensing signal is applied to an amplifier which in turn effects application of an electrostatic force on the rotor toward its centered position when the rotor is displaced or tends to be displaced from a central position between two electrodes. In the present invention, this sensing using a single frequency for sensing can provide proper restoring force because the amplified signal is cancelled before reaching or returning to the input of the amplifier channel.

Figure 2:
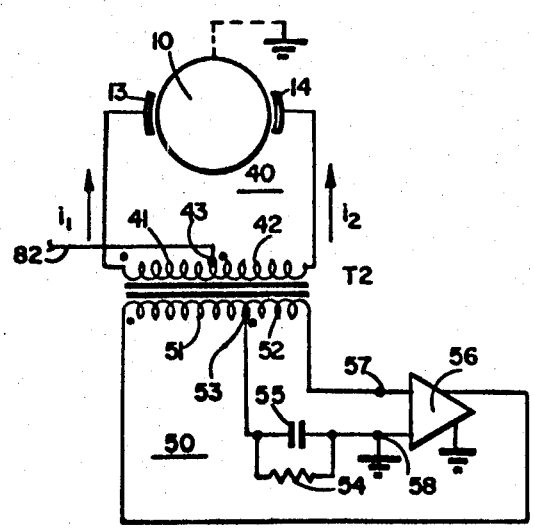

These and other objects of the invention will become apparent from a reading of the specification taken in conjunction with the drawings in which:

FIG. 1 illustrates electrostatic supporting circuit embodying the invention; and FIG. 2 illustrates one of the three supporting circuits utilized in the embodiment illustrated in FIG. 1.

FIG. 1 illustrates a three-axis support for an electrostatic gyro having a spherical conductive rotor 10 which is electrostatically rotatably supported by electrode plates 15 and 16 on the z-axis, electrodes 13 and 14 on the y-axis, and electrodes 11 and 12 (not shown) in the x-axis. Each of the above respective pairs of plates are preferably circular and concentric with the respective axes. It will be understood that these axes are mutually perpendicular. In addition, their inner surfaces preferably should be concave and concentric with the center of the sphere 10. In addition, these plates 11 through 16 are intersurfaces which define a sphere, i.e., slightly larger than and having the same center of curvature as electrically conductive sphere 10.

Electrodes 11 and 12 are connected to power supporting circuit 20 for supporting the sphere 10 in the x-axis. A sensing and servo circuit 30 is coupled to the power supporting circuit 20 so as to effect centering of the sphere 10 between electrodes 11 and 12. That is, if the sphere 10 tends to not be centered between electrodes 11 and 12, the sensing and centering circuit 30 will effect application of an alternate circuit signal through power circuit 30 to electrodes 11 and 12 so as to apply an electrostatic force to rotor 10 to center the sphere therebetween.

Electrodes 13 and 14 are connected to power supporting circuit 40 for supporting the sphere 10 between electrodes 13 and 14. Sensing and servo circuit 50 is coupled to the power supporting circuit 40 so as to sense when the sphere 10 is not midway between electrodes 13 an 14 and in response thereto to apply a signal to the power circuit 40 to effect the center of sphere 10 between electrodes 13 and 14. Electrodes 15 and 16 are connected to power supporting circuit 60 so as to electrostatically suspend and support the rotor 10 midway between electrodes 15 and 16. A sensing and servo circuit 70 is coupled through a transformer T3 to the power circuit 60 so as to effect centering of the sphere 10 between electrodes 15 and 16 at all times.

The rotor sphere 10 is an electroconductive sphere made of some material such as aluminum. In the preferred form shown in FIG. 1, a three-phase power supply 80 through conductors 81, 82 and 83 provides power in three phases as indicated in FIG. 1 electrostatically suspend through circuits 20, 40, and 60 the sphere 10. The power supply illustrated in the embodiment in FIG. 1 and FIG. 2 is a constant voltage power supply; however, a constant current supply could be utilized. More specifically, conductor 81 is connected to the center tap of the secondary winding of transformer T1 of circuit 20. Conductor 82 is connected to the center tap of the secondary winding of transformer T2 and power circuit 40. This applies an alternating current voltage between electrodes 13 and 14 and the sphere 10. Conductor 83 is connected to the center tap of the secondary winding of transformer T3 and the power circuit 60. Thus, by this connection between the three-phase power supply 80 and the power circuits 20, 40 and 60 along with circuits 30, 50 and 70, sufficient voltage is effected between the electrodes and the conductive sphere 10 so as to normally rotatably electrostatically support sphere 10 along three mutual perpendicular axes. When utilized as a gyroscope, many suitable ways can be employed to effect rotation of the rotor 10 so as to operate the rotor 10 as a gyroscope rotor. As is well known, an electrostatically supported gyroscope will "coast" a considerable length of time after rotary power movement has been applied to the rotor, i.e., it is only necessary to apply a force to the rotor of an electrostatically supported gyroscope once every year or two for the rotor to operate as a gyroscope. Such means of rotating this gyroscope rotor 10 could be well known in the art and forms no part of the present invention.

FIG. 2 illustrates a schematic diagram of the power supporting circuit 40 and the sensing servo circuit 50 which are utilized to electrostatically support and center the conductive sphere or rotor 10 between electrodes 13 and 14 in the y-axis. Since the power circuit 20 with the sensing and servo circuit 30 as well as the power circuit 60 with the sensing and servo circuit 70 are identical to the power supporting circuit 40 with the sensing and servo circuit 50 only the power supporting circuit 40 and the sensing and servo circuit 50 will be described in detail.

As shown in FIG. 2, the secondary of the transformer T2 is center tapped at 43, so as to divide this secondary into two equal windings 41 and 42 having an equal number of turns. These windings are poled as shown by the dots in the drawing and have their outer ends electrically connected to the concave electrodes 13 and 14. Due to the voltages applied through conductors 81 and 83, to their respective electrodes, the conductive sphere 10 will be maintained at AC ground. Thus, when a voltage is applied through conductor 82, current will flow through coils 41 and 42, electrodes 13 and 14 respectively, and hence, through the conductive sphere 10 back to ground. When the sphere 10 is centered or equidistant from electrodes 13 and 14, two branch currents $i_1$ and $i_2$ shown in FIG. 2 passing through windings 41 and 42 respectively will be equal. When these currents are equal and the sphere 10 is centered in the y-axis, there will be no current induced back into the primary of transformer T2. The sensing and servo circuit 50 includes the primary of transformer T2 having a tap 53 so as to define windings 51 and 52. In the servo loop, there is a power amplifier 56 having two input terminals 57 and 58 (grounded). There is no phase change in 56, that is, the input and output signals are in phase. The input of this amplifier preferably has a high input impedance at the frequency of power supply 80. The frequency of this power supply may be, for example, 5,000 c.p.s.

One end of winding 52 is connected to input terminal 57 whereas the other end of winding 52 (tap or reference point 53) is connected to a capacitor 55 connected in shunt with the resistor 54. The other end of capacitor 55 and resistor 54 are connected to the other grounded input terminal 58 of amplifier 56. As can be seen, the output of amplifier 56 is connected across winding 51 and the shunt combination of resistor 54 and capacitor 55. Thus, when there is a output from the amplifier 56, it will effect a predetermined portion of this output voltage across capacitor 55 and resistor 54 so as to result in a voltage at reference point 53.

The network, consisting in this example of the resistor 54 and capacitor 55, has at the operating frequency an impedance of the same phase angle as the impedance which is seen across winding 51 (reflected through the transformer T2). Winding 51 and network 54 and 55 thus comprise a voltage divider which effects a voltage at 53, relative to ground (58) which is a specific fraction of the amplifier output voltage 56. The coil 52 is designed so that as a result of a voltage output from amplifier 56, the voltage at point 57, relative to point 53, is identical to the voltage at point 58, relative to point 53. In setting up the operation of this circuit, it is convenient first to make a test with the sphere held centered (or replaced by dummy capacitors at 13 and 14 as well as 11, 12, 15 and 16) and with connection 82 unexcited and connected to ground directly or through an impedance matching that of the source 80. With 82 unexcited, the connection at the output of amplifier 56 is broken; this connection to the dot side of winding 51 is then driven at the design frequency. This excites the transformer T2 through winding 51. With setup, the values of the capacitor 55 and resistor 54 are tuned or adjusted until the phase and amplitude of the voltage across 55 and 54 are such that no voltage appears at point 57. (This is most easily measured at the disconnected output of amplifier 56).

This adjustment, however, does not prevent winding 52 from producing an input to amplifier 56 (at 57, with respect to 58). It does prevent any portion of the output signal of amplifier 56 from appearing at its own input terminals, which is an object of the circuit.

When the conductive sphere 10 is off center between electrodes 13 and 14, the capacitance between electrodes 13 and 14 and the sphere 10 will become unequal as will the current $i_1$ and $i_2$. When these currents become unequal, their difference will effect a voltage on the secondary of transformer T2 and across winding 52. This relatively small sensing voltage applied across winding 52 will thereby effect a signal to the input terminals 57 and 58 of power amplifier 56. Power amplifier 56 will then produce a correct amplified signal at its output which will be applied across winding 51 and the shunt combination of capacitor 55 and resistor 54.

The transformer T2 will produce a voltage across windings 41 and 42. This voltage will add to the voltage at either plate 13 or 14, while subtracting from the voltage at the other. The elements of the circuit are adjusted so that the phase of the voltages across 41 and 42 is such that the voltage adds to the voltage 82 on one side while subtracting on the other side. The circuit is also adjusted so that the voltage increases on the side which has the lower capacity (larger gap) to the supported sphere. Thus, a centering force is effected. The gain of the amplifier 56 controls the "stiffness" of the support or the ratio of the force on sphere 10 to the deflection of sphere 10, while deflection, through the circuitry described, produces the force. This stiffness is limited only by the fineness and stability of the adjustment effected on network 54 and 55.

The amplifier 56, being an element in a "servomechanism" loop, may contain any of the many conventional servo compensation techniques used with an AC servoamplifier (e.g., an all AC network, demodulate-compensate-remodulate, etc.).

More specifically, the approximate values of 55 and 54 may be expressed mathematically. The capacity $C_{55}=2C_{14}N_{41}^2/N_{51}N_{52}$ where the subscripts refer to the corresponding elements. That is, $C_{55}$ is the capacitance of 55; $C_{14}$ is the capacitance between electrode 14 and sphere 10 when sphere 10 is centered thus $C_{14}=C_{13}$; $N_{41}$ is the turns of winding 41; $N_{51}$ is the turns of winding 51; and $N_{52}$ is the turns of winding 52. In practice, several of these values are somewhat arbitrarily chosen, and the others are than adjusted (55 and 54) until cancellation occurs.

The resistance 54 should be adjusted to match core loss in T2 and any other dissipative elements in the circuit (such as wire resistance). It is understood that this network is by way of example, the basic purpose being to null out the loop gain as measured by breaking a connection in the amplifier 56 where 82 is grounded and the sphere is held centered.

It will be understood that the operation of the circuit illustrated in FIG. 2, and its construction described above would be identical to the combination of units 20 and 30 as well as circuits 60 ans 70. For this reason, it is felt to be unnecessary to repeat the detailed explanation as set forth for circuits 40 and 50.

While the invention has been described and illustrated in detail, it is to be clearly understood that this is by way of illustration and example only and is not intended by way of limitation. The spirit and scope of the invention being limited only by the terms of the appended claims.

I claim:

1. An electrostatic bearing control circuit for controlling the support of a member between a pair of electrodes, electrostatic support means establishing an AC potential between said member and said electrodes, sensing means providing an AC position signal which varies as a function of the position of said member with respect to said electrodes, an amplifier amplifying said position signal and having a first and second input terminal, means applying a first predetermined portion of the amplified position signal between a reference point an said first input terminal, and means applying a second predetermined portion of said amplified position signal between said reference point and said second input terminal with said first and said second portions being substantially equal but opposite in polarity.

2. A free rotor gyro comprising a rotor, first and second electrodes, a power circuit establishing an AC potential between said rotor and said electrodes to rotatably electrostatically support said rotor, differential means developing a differential current position signal which varies as the difference between the current passing through said first and said second electrodes, servo means connected between said differential means and said power circuit to maintain said rotor centered between said electrodes, said servo means including an amplifier for amplifying said position signal and having first and second input terminals, means applying a first predetermined portion of the amplifier position signal between a reference point and said first input terminal, and means applying a second predetermined portion of said amplified position signal between said reference point and said second input terminal with said first and said second predetermined portions being substantially equal but opposite in polarity.

3. Free rotor gyro comprising a rotor, first and second electrodes, a power circuit establishing an AC potential between said rotor and said electrodes to rotatably electrostatically support said rotor sensing means coupled to said power circuit for developing an AC signal which varies as a function of the potential of said rotor with respect to said electrodes, amplifier means, having first and second input terminals, means coupling said position signal to said first and second input terminals, means coupling the output means to said power circuit for centering said rotor between said first and said second electrodes in response to said position signal, means applying a first predetermined portion of the amplified position signal between a reference point and said first input signal, and means applying a second predetermined portion of said amplified position signal between said reference point and said second input terminal with said first and said second predetermined portions being substantially equal but opposite in polarity.

4. A free rotor gyro comprising a rotor, first and second electrodes, a power circuit establishing an AC potential between said rotor and said electrodes to rotatably electrostatically support said rotor, sensing means inductively coupled to said power circuit developing a differential current signal which varies as the difference between the current passing through said first and said second electrodes, amplifier means having first and second input terminals, means applying said differential current signal to said first and said second input terminals, the output of said amplifier means inductively coupled to said power circuit so as to effect centering of said rotor between said electrodes in response to said differential current signal, means applying a first predetermined portion of the amplified position signal between the reference point and said first input terminal and means applying a second predetermined portion of said amplified position signal between said reference point and said second input terminal and said portions being substantially equal but opposite in polarity so as to effect cancellation thereof.

5. A free rotor gyroscope comprising a rotor, first and second electrodes, a power circuit establishing an AC potential between said rotor and said electrodes to rotatably electrostatically support said rotor, sensing means developing a differential current position signal having an amplitude which varies as a function of the difference between the current passing through said first and second electrodes, amplifier means having first and second input terminals, means coupling said position signal to said first and second input signals, means applying the output of said amplifier across an AC voltage divider including an inductance inductively coupled to said power circuit to effect centering of said rotor between said first and second electrodes, impedance means connected between said first input terminal and said inductance so as to effect application of a first signal which varies as a function of the amplified position signal and in phase therewith, said inductance inductively coupled between said reference point and said second input terminal to effect application of a second signal which varies inversely as a function of the amplified position signal and said first and said second signal having substantially equal amplitude so as to effect cancellation therebetween.

6. A free rotor gyro comprising a rotor, first and second electrodes, a power circuit establishing an AC potential between said rotor and said electrodes, a transformer having a center tap primary and a tap secondary defining a reference point, the end of said primary being connected to said first and said second electrodes, power supply connnected between said rotor and said center tap for establishing an AC potential between said rotor and said electrodes to rotatably electrostatically support said rotor, amplifier means having first and second input terminals, one end of said secondary connected to said second input terminal and impedance means connected between said reference point and said first input terminal to effect application of a differential current signal which varies as a function of the difference between the current passing through said first and said second electrodes, the output of said amplifier being connected across said second winding and said impedance means to thereby effect application of a first signal between said reference point and said input terminal which varies as a function of the amplified position signal and said second winding inductively coupled to said first secondary winding to effect application of a second signal between said reference point and said second input terminal and said first and said second signals having substantially equal amplitude so as to effect cancellation therebetween.

7. An electrostatic bearing control circuit for controlling the support of a member between a pair of electrodes, an AC potential imposed on said electrodes, sensing means providing an AC position signal which varies as a function of the deflection of said member from a neutral position with respect to said electrodes, an amplifier amplifying said position signal, coupling means coupling the output of said amplifier to said pair of electrodes with such a manner as to polarity and phase to increase the net electrostatic force on said support member in a direction to restore said member toward a neutral center position and means substantially cancelling the output of said amplifier from being applied to the input of said amplifier.

8. An electrostatic bearing as set forth in claim 7 where one transformer couples said position signal to said amplifier and also operates as said coupling means.

9. An electrostatic support system for supporting a member between a pair of electrodes comprising in combination:
   electrostatic support circuit establishing an alternating potential between said member and said electrodes for electrostatically supporting said member;
   sensing means providing and alternating signal indicative of the displacement of said member form a centered position between said pair of electrodes; and
   impedance means responsive to said alternating signal and providing a signal to said electrostatic support circuit varying said alternating potential between said member and said electrodes so as to effect substantial centering of said member between said pair of electrodes.

10. An electrostatic support system for supporting a member between a pair of electrodes comprising in combination:
   electrostatic support circuit establishing an alternating potential between said member and said electrodes for electrostatically supporting said member;
   sensing means providing an alternating signal indicative of the displacement of said member from a centered position between said pair of electrodes; and
   positive impedance means responsive to said alternating signal and providing a signal to said electrostatic support circuit varying said alternating potential between said member and said electrodes so as to effect substantial centering of said member between said pair of electrodes.

11. The electrostatic support system of claim 2 wherein said provided signal of said impedance means is reflected through said sensing means ro said electrostatic support circuit.

12. The electrostatic support system of claim 2 wherein said sensing means is a transformer having a primary and a secondary winding, the primary winding of said transformer connected to said electrodes so as to sense the current flow between said electrodes and said supported member, the secondary of said transformer connected to said impedance means.

* * * * *